United States Patent [19]
Meyers

[11] Patent Number: 5,825,556
[45] Date of Patent: Oct. 20, 1998

[54] ZOOM LENS

[75] Inventor: Mark M. Meyers, Hamlin, N.Y.

[73] Assignee: Eastman Kodak Company, Rochester, N.Y.

[21] Appl. No.: 724,728

[22] Filed: Sep. 30, 1996

[51] Int. Cl.[6] .................................................. G02B 15/14
[52] U.S. Cl. .......................... 359/690; 359/689; 359/676; 359/684
[58] Field of Search .................................... 359/689, 748, 359/753, 784, 786, 787, 789, 791, 684, 695

[56] References Cited

U.S. PATENT DOCUMENTS

| 4,464,023 | 8/1984 | Kato et al. | 359/791 |
|---|---|---|---|
| 4,726,668 | 2/1988 | Nakayama et al. | 350/427 |
| 5,062,695 | 11/1991 | Iwasaki | 359/689 |
| 5,148,321 | 9/1992 | Goto et al. | 359/689 |
| 5,216,547 | 6/1993 | Ogata | 359/689 |
| 5,325,235 | 6/1994 | Takashima et al. | 359/689 |
| 5,327,290 | 7/1994 | Fukushima et al. | 359/692 |
| 5,353,159 | 10/1994 | Morooka | 359/689 |
| 5,353,160 | 10/1994 | Ogata | 359/689 |
| 5,424,870 | 6/1995 | Hashimura et al. | 359/689 |
| 5,434,711 | 7/1995 | Tetsuya et al. | 359/689 |
| 5,493,448 | 2/1996 | Betensky et al. | 359/692 |
| 5,559,636 | 9/1996 | Ito | 359/689 |
| 5,715,096 | 2/1998 | Meyers | 359/689 |
| 5,726,810 | 3/1998 | Meyers | 359/684 |

*Primary Examiner*—Frank G. Font
*Assistant Examiner*—Michael Stafira
*Attorney, Agent, or Firm*—Svetlana Z. Short

[57] ABSTRACT

A zoom lens comprises a plurality of lens elements arranged into three lens units. More specifically, there is a first lens unit of positive refractive power, a second lens unit of negative refractive power, and a third lens unit of positive refractive power. The third lens unit is located between the first and the second lens units. The plurality of lens elements provide: (i) a zoom ratio greater than 1.5, (ii) an F/number in the telephoto position of less than F/5 and an F/number in the wide angle position of less than F/3.6, (iii) and an overall compactness ratio $L_v/f_t<1.0$, where $L_v$ is the distance from a front vertex of the zoom lens to the image plane in a telephoto position, and $f_t$ is the focal length of the zoom lens in the telephoto position.

21 Claims, 10 Drawing Sheets

ZOOM LENS

BACKGROUND OF THE INVENTION

1. Field of the Invention

This invention relates to compact zoom lenses having large numerical apertures and a small number of lens elements, and more particularly to zoom lenses which are suited for use as an objective or taking lens in photographic cameras, video cameras, electronic cameras, or the like.

2. Description of the Prior Art

Zoom lenses generally are formed of a plurality of lens units (also referred as lens groups) of one or more lens elements. It has been known to make three-unit zoom lenses with a positive front lens unit, a positive middle lens unit, and a negative rear lens unit. However, although the compact zoom lenses of this type often have a small number of lens elements, they also have relatively small numerical apertures and relatively large F/numbers. (The numerical aperture NA of any lens is inversely proportional to its F/number (F/#)). The F/numbers of the above described zoom lenses are typically F/4–F/5 in the wide angle position (W) and F/7–F/9 in the telephoto position (T). (The specific examples of these lenses will be described in more detail further down in this section.)

The smaller the numerical aperture of a lens (the larger is the F/#), the smaller the amount of light that the lens is capable of delivering to the image plane. Therefore, in order to take pictures under the adverse (i.e., dark) lighting conditions, zoom lenses with low numerical apertures require the use of higher speed films (otherwise, the film would be underexposed and the pictures would be too dark). Because of the high speed film use, the resultant photographs tend to be "grainy".

Zoom lenses with high numerical apertures also exist. However, they have a large number of lens elements and are thus are more expensive and not as compact as zoom lenses with fewer lens elements. Thus, there is a need for compact, high numerical aperture zoom lenses that can take good pictures under the adverse lighting conditions.

More specifically, a zoom lens must maintain high image quality in each zoom position and retain a flat field over a range of field angles. In addition, it is desirable to have a minimum front vertex to film distance in the telephoto position. This provides a small package size and decreases the overall zoom lens volume. It is also desirable to have a minimal number of separate zooming lens units in order to decrease mechanical complexity. However, the requirement to produce a compact zoom lens with a small number of lens elements often conflicts with the requirement to produce a zoom lens with a high numerical aperture (low F/#).

The following five U.S. patents all describe zoom lenses which have three lens units of positive, positive and negative optical power, respectfully.

U.S. Pat. No. 5,424,870, issued Jun. 13, 1995 discloses two zoom lens embodiments (embodiments 5 and 6) with relatively few lens elements (five and four, respectively). Zoom ratios of these zoom lens embodiments are 2 and 1.7, respectively. (A zoom ratio is defined as a ratio of the two focal lengths, $f_t/f_w$, where $f_t$ is the focal length of the zoom lens in the telephoto (T) position and $f_w$ is the focal length of the zoom lens in the wide (W) position.) In these embodiments, the rearmost, negative lens element is biconcave and biaspheric. The F/numbers of these embodiments are F/4.1 (W) and F/7.7 (T) in the fifth embodiment; and F/4.1 (W) and F/6.6 (T) in the sixth embodiment.

U.S. Pat. No. 5,353,160, issued Oct. 4, 1994, discloses a zoom lens which has either four or five lens elements arranged into three movable lens units. In some embodiments, the rearmost, negative lens element is biconcave. Only one surface of this lens element is aspheric. The zoom lens embodiments have zoom ratios $f_t/f_w$ of about 1.5 to 2.0. The F/numbers are F/4.6 (W), F/7.5 (T) in the first and second embodiments; and F/5.6 (W), F/7/1 (T) in the third and fourth embodiments.

U.S. Pat. No. 5,325,235, issued Jun. 28, 1994, has relatively few lens elements (four). Its zoom ratio about 1.6. In some embodiments, the rearmost lens element is biconcave. Only one surface of this lens element is aspheric. F/numbers of the disclosed embodiments are about 5.8 (W) and 8.3 (T).

U.S. Pat. No. 5,216,547, issued Jun. 1, 1993, has relatively few lens elements (four). In some embodiments, the rearmost lens element is biconcave. Only one surface of this lens element is aspheric. The F/numbers of the disclosed embodiments are about F/4.7 (W) and to about F/7.2 (T).

U.S. Pat. No. 5,434,711, issued Jul. 18, 1995, discloses 2 embodiments (examples 5 and 8) with a biaspheric rear lens element. In each of these embodiments, the rearmost, negative lens element is a meniscus lens element. The F/numbers of the disclosed embodiments are about 4.0 (W) and about 8.3 (T).

SUMMARY OF THE INVENTION

An object of the present invention is to provide a compact zoom lens which offers superior optical performance, a relatively large zoom range (i.e. a zoom ratio larger than 1.5) and higher numerical apertures than prior art zoom lenses.

It is another object of the present invention to provide a zoom lens that has higher numerical apertures than prior art zoom lenses and in addition has as few as possible independently movable lens units.

A zoom lens according to the present invention comprises a plurality of lens elements arranged into three lens units. More specifically, there is a first lens unit of positive power, a second lens unit of negative power, and a third lens unit of positive power. The third lens unit is located between the first and the second lens units. The plurality of lens elements provide: a zoom ratio greater than 1.5, an F/number in the telephoto position of less than F/5 and an F/number in the wide angle position of less than F/3.6, and an overall compactness ratio $L_v/f_t<1.0$, where $L_v$ is the distance from a front vertex of the zoom lens to the image plane in a telephoto position, and $f_t$ is the focal length of the zoom lens in the telephoto position.

According to a preferred embodiment of the present invention, the F/number in the telephoto position is less than F/4.5 and the F/number in the wide angle position of less than F/3.

Also, according to the preferred embodiment of the present invention, during zooming from a wide-angle to a telephoto position, the front lens unit and second lens unit are integral so as to be simultaneously movable at the same speed and direction. The third lens unit moves towards the object side at a relatively slower speed than that at which the front and the rear lens units are moved.

Also, according to the preferred embodiment of the present invention, an aperture stop moves integrally with lens elements of the front lens unit.

Also, according to the preferred embodiment of the present invention, the zoom the second lens unit includes a biconcave negative lens element which is a biaspheric lens element with its object side surface having more asphericity than its image side surface.

With the preferred embodiment of the invention, the following and other advantages are realized. It is an advantage of the zoom lens of the present invention is that it is compact (i.e. it has a compactness ratio $L_v/f_t<1.0$), and that it has high numerical apertures in both the wide angle and the telephoto positions, while having a zoom ratio of over 1.5 and providing superior image quality.

BRIEF DESCRIPTION OF THE DRAWINGS

FIG. 1A is a sectional view of the zoom lens 100 in a wide-angle position.

FIG. 1B is a sectional view of the zoom lens 100 in a middle position.

FIG. 1C is a sectional view of the zoom lens 100 in a telephoto position;

DESCRIPTION OF THE PREFERRED EMBODIMENT

Figure 1A:
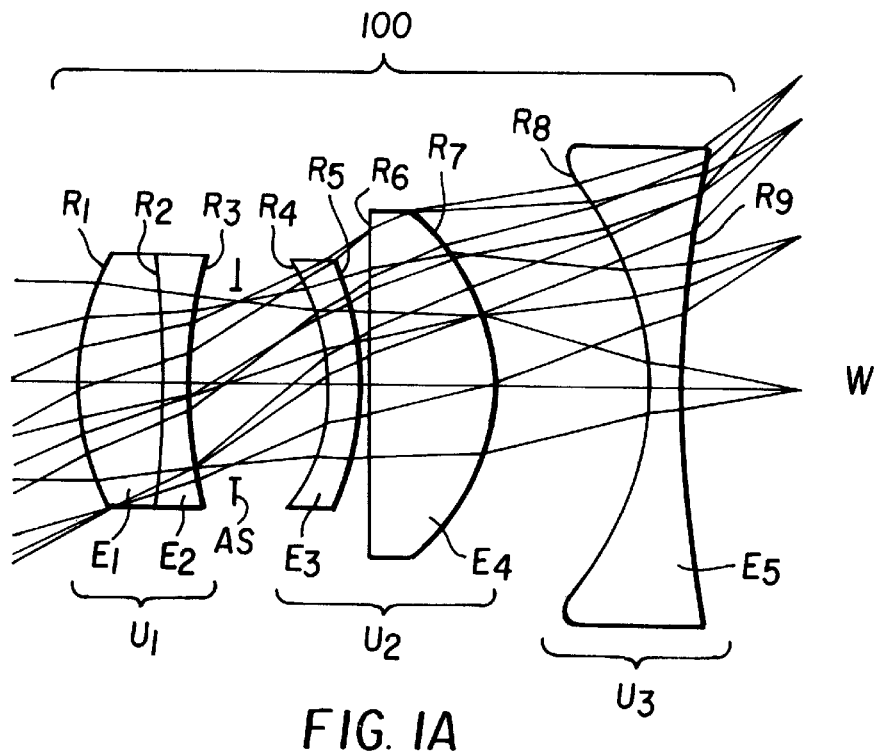
FIGS. 1A–1C show a sectional view of the zoom lens 100 of the preferred embodiment.
Figure 1B:
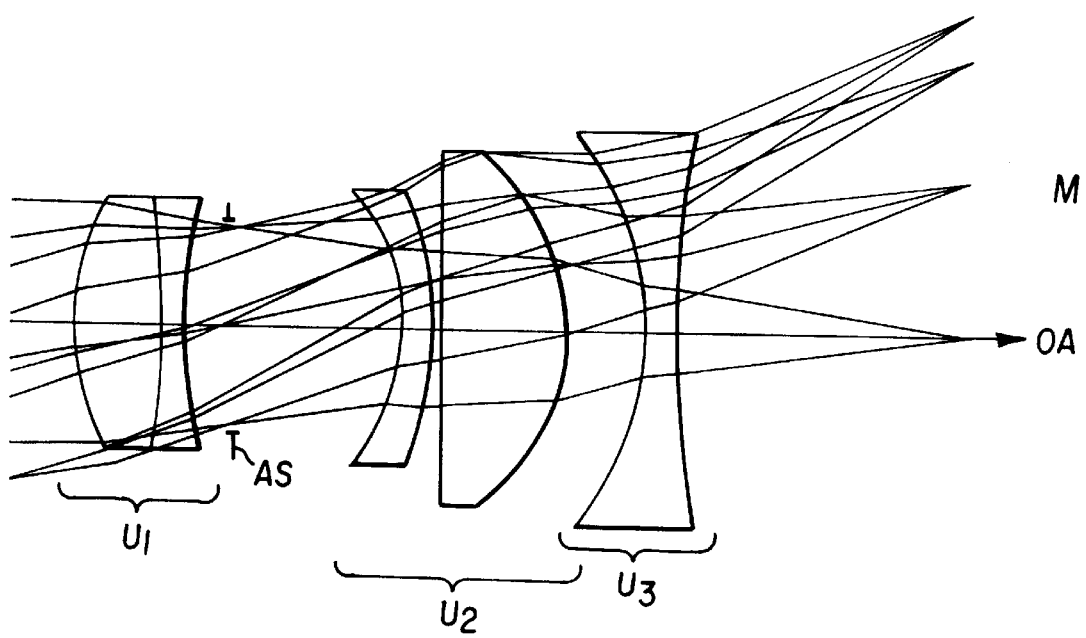
Figure 1C:
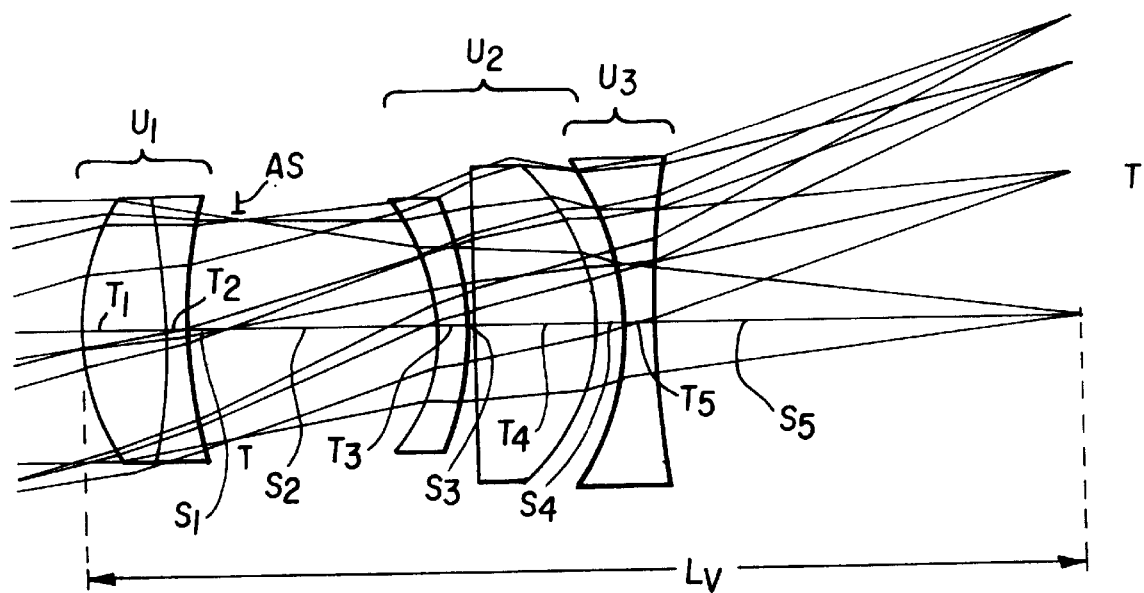

A zoom lens 100 is illustrated in FIGS. 1A–1C. The specific parameters of this zoom lens are set fourth in Tables 1A–1C. In the tables and the drawings, the lens surfaces have corresponding radii $R_i$ which are numbered by subscripts from the front or object side of the lens to the rear or image side of the zoom lens. The thickness $T_i$ of the lens elements and the spacings $S_i$ between elements are also numbered from front to rear. For example, $S_1$ corresponds to the first air space, $S_2$ to the second air space, $S_3$ to the third air space, and $S_4$ to the fourth airspace. In the tables, spaces and thicknesses are listed on the same line as the surface preceding the space or thickness, as the case may be. All indices $N_e$ are for the mercury e line of the spectrum at a wavelength $\lambda_e$ of 546.1 nm. The symbol V stands for the Abbe V-number of the lens material. The thickness and the spacings provided in the tables are in millimeters.

Description of Lens Unit Configuration

Figure 3A:
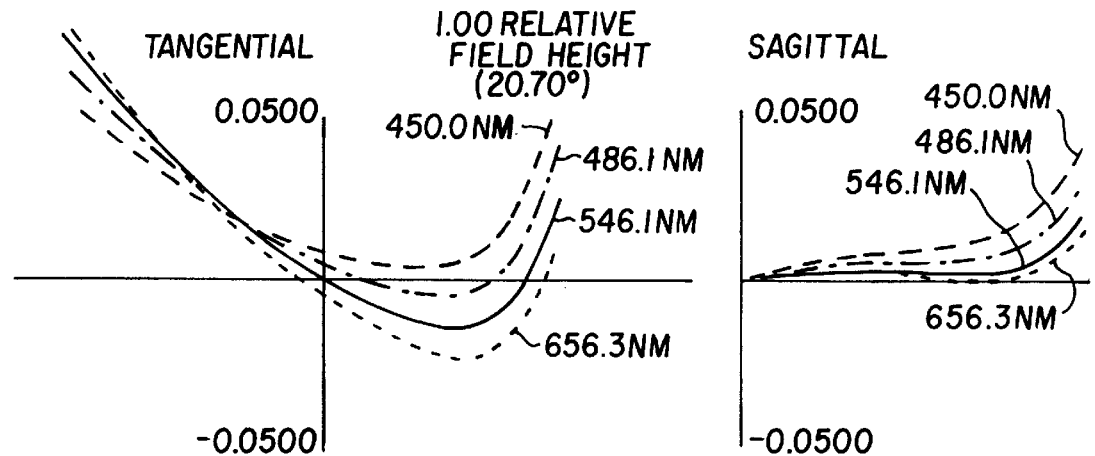
Figure 3B:
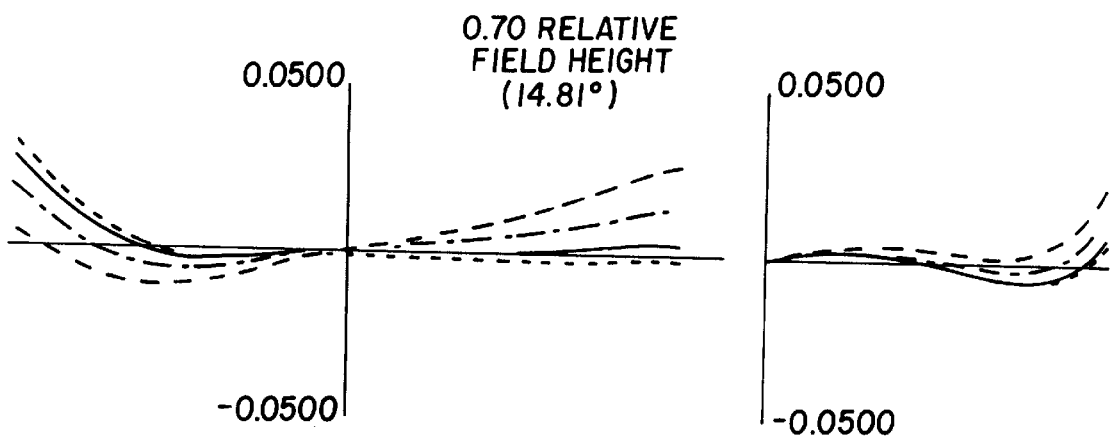
Figure 3C:
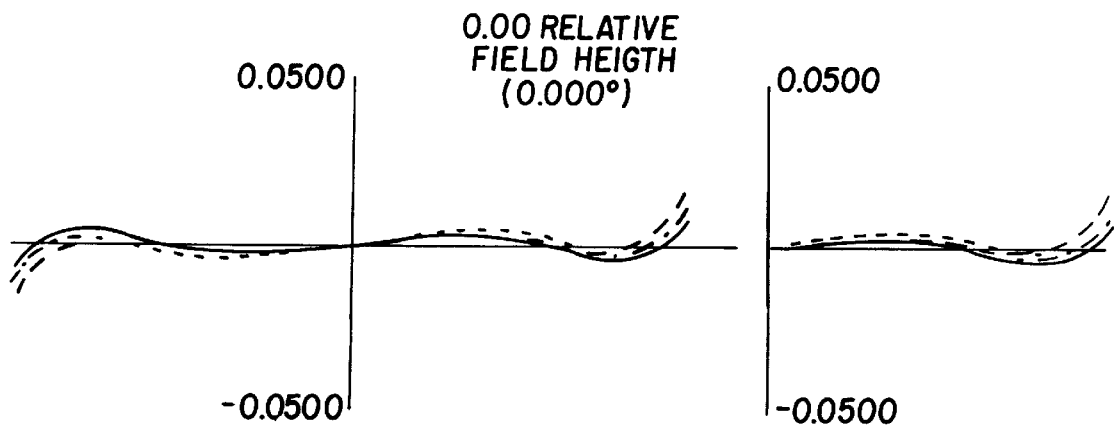

The zoom lens 100 includes three axially movable lens units $U_1$, $U_2$ and $U_3$. Lens units $U_1$ and $U_3$ are linked together mechanically and move together during zooming, as shown in FIG. 3. Therefore, the space between these two lens units (i.e. $U_1$ and $U_3$) does not vary for zooming, and thus the zoom lens has the substantial advantage of requiring a much simpler zooming mechanism than those required by typical zoom lenses having three independently moving lens units. However, if a larger zoom ratio is desired, all three lens units can be made to move independently (i.e. at different speed relatively to one another). More specifically, in this, preferred embodiment, the front lens unit $U_1$ and the rear lens unit $U_3$ move integrally. They are simultaneously movable at the same speed and direction, while the middle lens unit $U_2$ is movable in the same direction at a slower speed. The space between the first lens unit $U_1$ and the middle lens unit $U_2$ widens while the airspace between the middle lens unit $U_2$ and the rear lens unit $U_3$ narrows as the three lens units move toward the object side (along an optical axis) when the zoom lens zooms from a wide-angle position (W) towards a telephoto position (T).

According to the illustrative embodiments, the front lens unit $U_1$ is an achromatized positive power doublet. The focal length $FL_1$ of the first lens unit $U_1$ is about 24.9 mm and its power is about $4.01\times10^{-2}$. It is preferable for this doublet to be a cemented doublet with a positive power lens element $E_1$ located in front (i.e. towards the object side) and a negative power lens element $E_2$ located behind lens element $E_1$. The use of a cemented doublet as the front lens unit $U_1$ allows for the achromatization of one of the zooming lens units. In addition, using a cemented doublet makes for simplified mounting and alignment of the front lens unit $U_1$ compared to what is required in a design which utilizes airspaced doublets, such as the one disclosed in the above-mentioned U.S. Pat. No. 5,353,160. This simplification occurs because it is easier to center two lens elements which are cemented together before they are mounted in a lens barrel, than it is to center two airspaced lens elements in the lens barrel. This is due to the typical manufacturing variations of mount surfaces and variations of lens element diameters. Displacement of the optical axis of the two non-cemented lens elements caused by lens diameter variations or mounting variation can cause aberrations such as field tilt and axial color.

Furthermore, using a positive power front lens element $E_1$ allows the light rays to be bent towards focus (i.e. to converge) at the first surface, whereas a negative power front lens element actually causes the light rays to diverge. Thus, a zoom lens with the positive power front lens element $E_1$ can be more compact (i.e. shorter) than a similar zoom lens with a negative power front lens element. Additionally, the zoom lens with a positive power front lens element can use lens elements with smaller clear aperture diameters in the front lens unit. Having a positive power frontmost lens element $E_1$ also helps to achieve a better compactness ratio $(L_v/f_t)$. Finally, the positive front unit $U_1$, where the front lens element $E_1$ is positive, produces lower overall astigmatism, flatter field curves (lower petzval curvature) and generates less image plane distortion over the zooming range than similar zoom lenses with a negative power front lens element in the front lens unit.

According to the illustrative embodiment, the middle lens unit $U_2$ is located behind the front lens unit $U_1$. The middle lens unit $U_2$ is also positive (i.e. it has positive power). It contains two very slightly airspaced lens elements (a meniscus lens element $E_3$ and a meniscus lens element $E_4$). The focal length $FL_2$ of the second lens unit $U_2$ is about 10.4 mm and its power is about $9.60\times10^{-2}$.

The rear optical unit $U_3$ is substantially negative in power. Its focal length $FL_3$ is about −8.61 millimeters and its power is about $-1.16\times10^{-2}$. The rear optical unit $U_3$ contains a strong negative power lens element $E_5$ which is biconcave and biaspheric. The object side surface of lens element $E_5$ has a smaller radius of curvature then that of the image side surface. The use of a strong negative lens element $E_5$ in the rear allows for the zoom lens to have a very effective field flattener when the zoom lens is in wide-angle position and provides for a high level of aberration correction in the telephoto position. The compact zoom lens of the present invention also achieves minimization of the front vertex to film plane distance partially via the use of the strong rear lens element $E_5$ and also due to the relative movement of the middle lens unit $U_2$ towards this negative lens element $E_5$. The lens element $E_5$ has a high V-number. The use of an optical material with a high V-number (i.e., V-number≅60 or higher) helps to eliminate lateral color and improves axial color aberration, especially at the wide angle position.

The zoom lens of the present embodiment has a zoom ratio of 2. Its F-number ranges between F/2.8 and F/4.0. It accommodates a field of view of ±29.5 degrees.

Aperture Stop

The aperture stop AS is in the form of a shutter which is positioned with the front lens unit $U_1$. That is, the shutter moves together with the front lens unit $U_1$. This positioning of the aperture stop AS is advantageous because it facilitates correction of aberrations of the zoom lens, especially at its telephoto position. The placement of the aperture stop AS with the front lens unit $U_1$ helps to provide a large numerical aperture (F/4.0) at the long focal length position (i.e., the telephoto position T).

Stop shifted aberrations, which are always present in zoom lenses to some extent and which are described in Smith, *Modern Optical Engineering,* (second edition) published by McGraw-Hill, Inc., tend to vary more if the distance between the aperture stop and the front zoom lens unit varies. Thus, placing the aperture stop AS with the front lens unit $U_1$ allows better control of aberrations such as distortion through the stop shift equation. That is, moving the aperture stop AS relative to the front lens unit $U_1$ (i.e. the first zooming unit) causes the distortion to change with zoom position. On the other hand, we found that placing the aperture stop AS with the front lens unit $U_1$ significantly improved distortion correction.

The location of the aperture stop AS behind the lens elements of the front lens unit $U_1$ also allows better control of astigmatism as a function of zoom position, because highly aberrated rays in the wide-angle position can more easily be vignetted out of the image forming bundle.

In addition, the placement of the aperture stop AS with the front lens unit $U_1$ reduces the size of the first lens unit $U_1$, which simplifies mounting and reduces the size of the telescoping zoom lens barrel.

Figure 6:
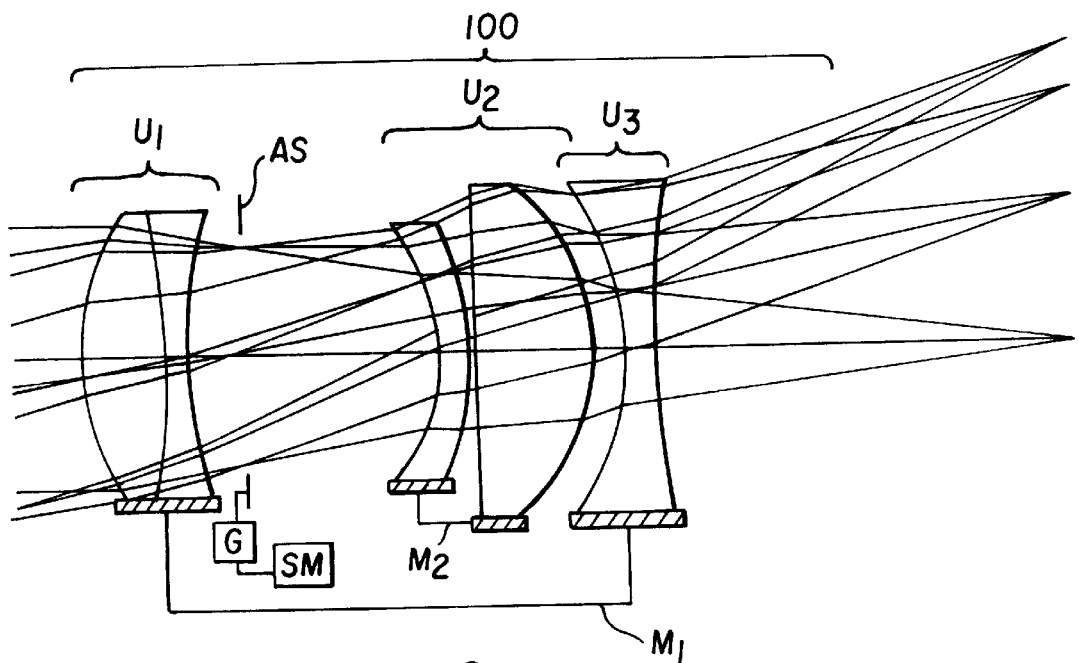
FIG. 6 is a schematic side-sectional view of a zoom lens 100 and a mount.

As shown in FIG. 3, the mechanical mount for this type of zoom lens is generally constructed with the larger mount $M_1$ connecting the front and rear lens units $U_1$ and $U_3$ and a smaller mount $M_2$ for the middle lens unit $U_2$ which is nested inside the larger lens mount. Having the shutter attached to the front lens unit $U_1$ allows the shutter to be mounted on a larger lens mount $M_1$ which links the front and rear lens units $U_1$ and $U_3$ together. A gearing mechanism G and a stepping motor SM could be used to control the opening size of the shutter. Locating the shutter with the front lens unit $U_1$ is more advantageous than locating it with the middle lens unit $U_2$ since there is more room around the front lens unit $U_1$ and the larger mount $M_1$ is more stable mechanically (see FIG. 6).

In addition, mount $M_1$ has fewer mechanisms associated with it than mount $M_2$ and is therefore easier to access. Thus, it is easier to assemble and align the shutter and other lens elements, which leads to low cost zoom lenses.

Aspheric Surfaces

The zoom lens 100 has three aspheric surfaces. The aspheric equation describing these aspheric surfaces is:

$$X = \frac{CY^2}{1+\sqrt{1-(K+1)C^2Y^2}} + ADY^4 + AEY^6 + AFY^8 + AGY^{10} +$$

$$AHY^{12} + AIY^{14} + AJY^{16} + AKY^{18}$$

where:
X is the distance along the optical axis OA;
Y is the height from the optical axis;
C is the reciprocal of the vertex radius of curvature of the curved lens surface;
K is the conic coefficient; and
AD through AK are aspheric coefficients of 4th, 6th, 8th, 10th, 12th, 14th, 16th, and 18th order. The values of the aspheric coefficients for the various aspheric surfaces of the zoom lens 100 are provided in the Table 1B.

Figure 4A:
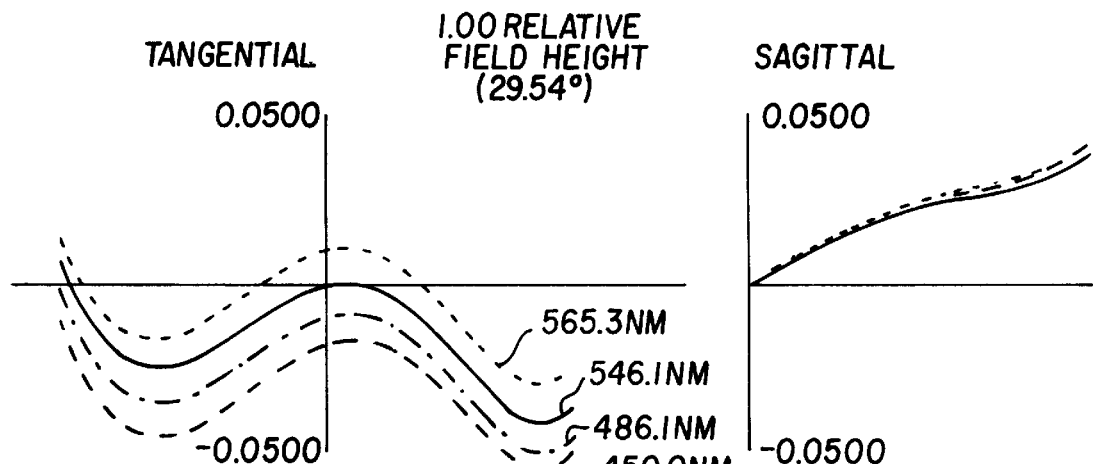
Figure 4B:
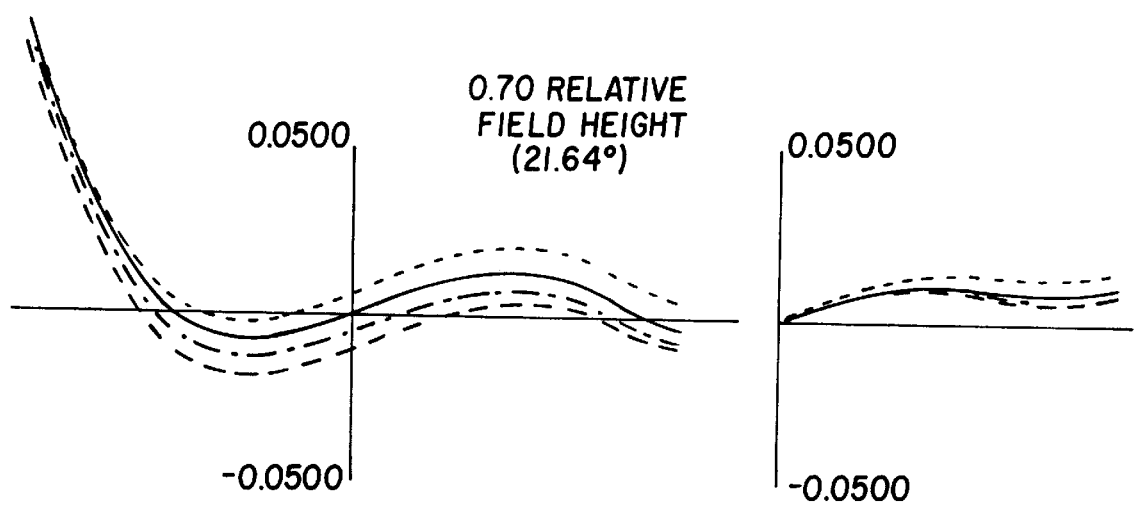
Figure 4C:
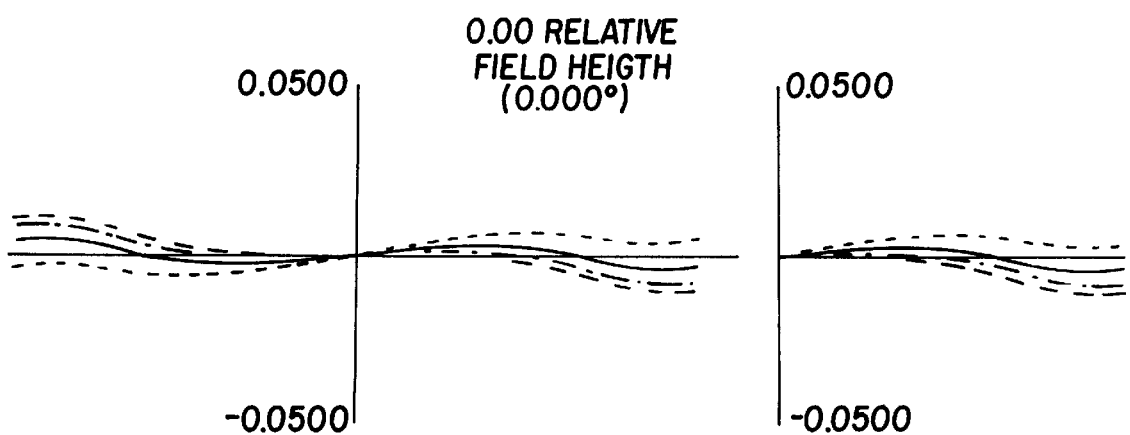
Figure 7A:
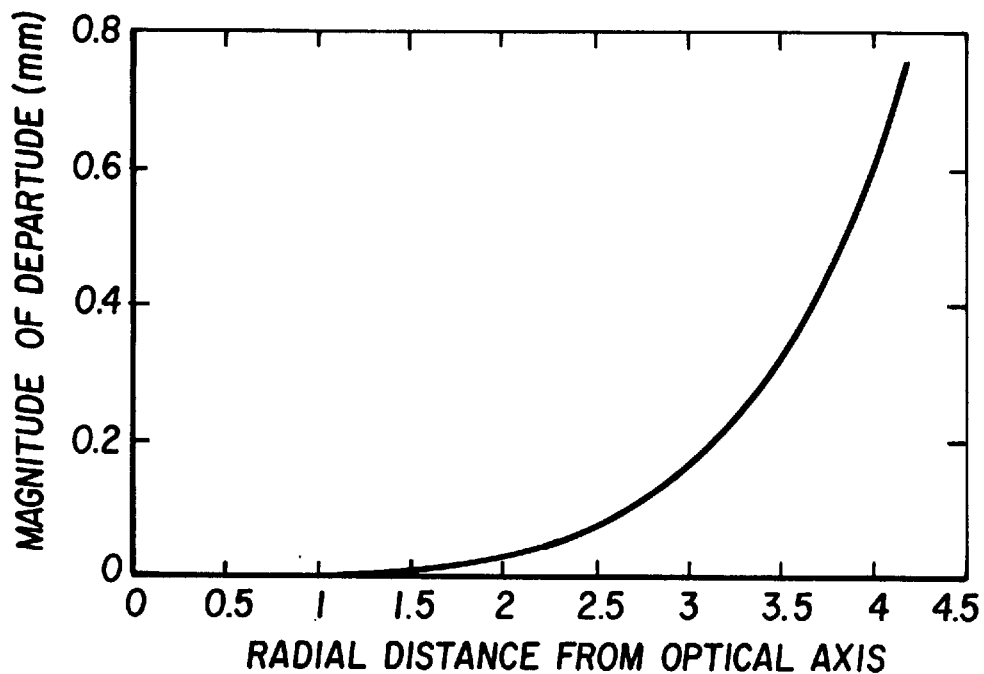
FIGS. 7A–C are graphical representations of the amount of asphericity of various aspheric surfaces of the zoom lens 100.
Figure 7B:
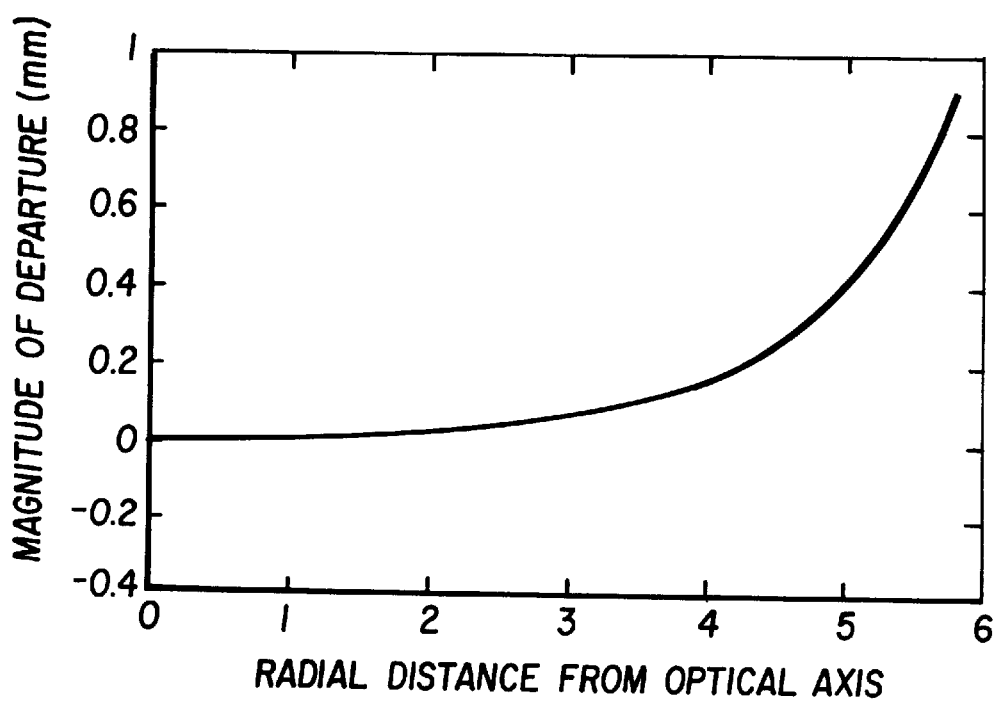
Figure 7C:
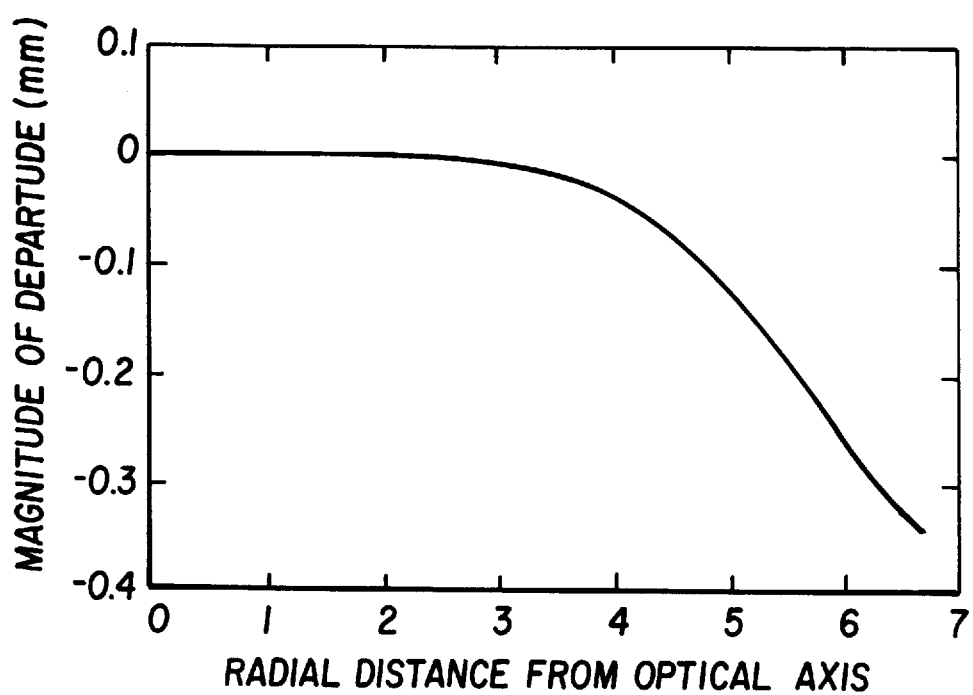

More specifically, the aspheric surfaces are located on the surfaces with radii $R_5$, $R_8$, $R_9$ associated with lens elements, $E_3$ and $E_5$, respectively. The amount of asphericity of any surface is defined as the maximum amount of aspheric departure from the vertex sphere at that particular surface. The amount of aspheric departure (in millimeters) from the vertex sphere at each of the aspheric surfaces of the zoom lens 100 are plotted in FIGS. 7A–7C. The vertical axis is the magnitude of the aspheric departure in millimeters. The horizontal axis is the radial distance from the optical axis. FIG. 7A illustrates the amount of aspheric departure on the surface with the radius $R_5$. FIGS. 4B and 4C illustrate the aspheric departure on surfaces with the radii $R_8$ and $R_9$, respectively. More specifically, FIGS. 7B and 7C illustrate that the amount of aspheric departure on the object side surface of the fifth lens element (i.e., the surface with radius of curvature $R_8$) is greater than that of the image side surface (i.e., the surface with the radius of curvature $R_9$). This helps to control field curvature and astigmatism. The use of aspheric surfaces on the last, negative power lens element $E_5$ and on a lens element $E_3$ in the middle unit $U_2$ provides several advantages. First, it helps to minimize the number of lens elements in the zoom lens. Secondly, having a biaspheric rear lens element when used in conjunction with one more aspheric surface helps achieve a zoom lens with high numerical apertures (i.e., F/#<5 at the telephoto position and F/#<3.6 at the wide angle position, and preferably F/#<4.5 (T) and F/#<3 (W)). In this embodiment the F numbers are F/4 (T) and F/2.8 (W).

More specifically, the aspheric surface on the front surface of the rear lens element $E_5$ has a strong conic contribution described by a conic coefficient K. This conic contribution controls field dependent aberrations such as Coma, Astigmatism and Petzval curvature. The use of an aspheric surface on a strong negative rear element $E_5$ allows field aberrations encountered at different zooming positions to be addressed with different segments of the lens aperture. This allows the use of higher order aspheric terms to compensate for field aberrations at the wide-angle zoom positions while the lower order aspheric terms are used primarily in the telephoto mode The compact zoom design utilizes low cost glasses, as well as a plastic element (such as lens element $E_3$) to minimize the cost of the zoom lens. The plastic element $E_3$ is chosen to be an element with relatively low power so that the environmental effects on the refractive index, surface radii and thickness of the plastic element will not greatly degrade the zoom lens performance over a wide range of temperature and humidity.

Figure 2A:
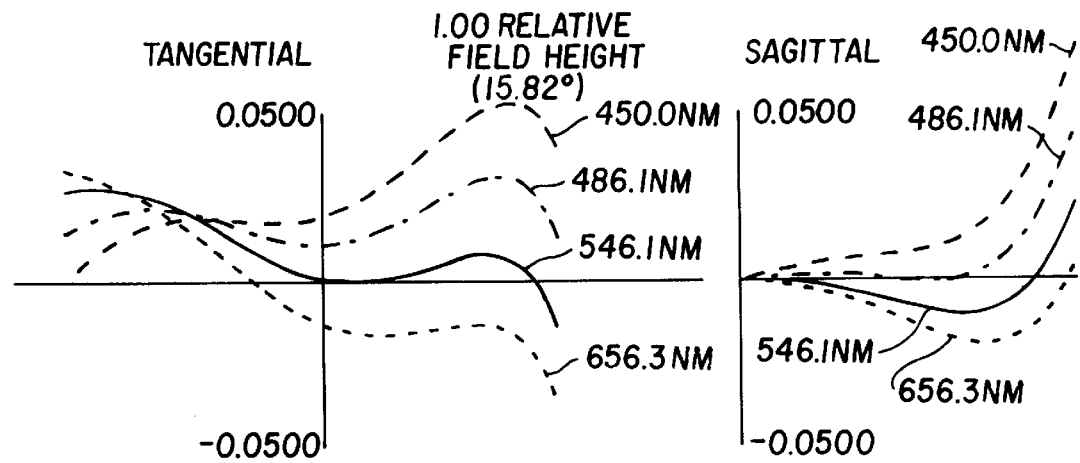
FIGS. 2A–5C are graphical representations of the aberrations of the zoom lens 100 illustrated in FIGS. 1A–1C.
Figure 2B:
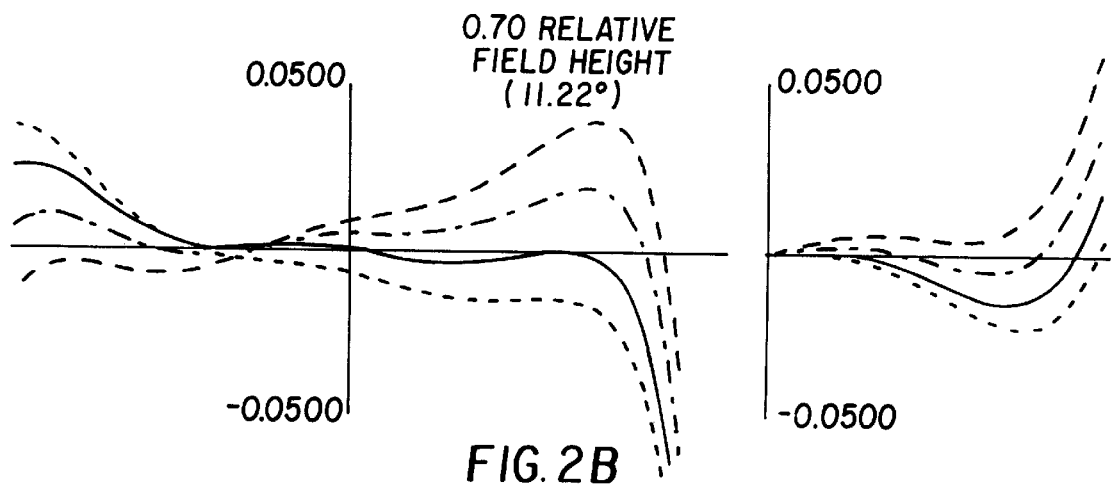
Figure 2C:
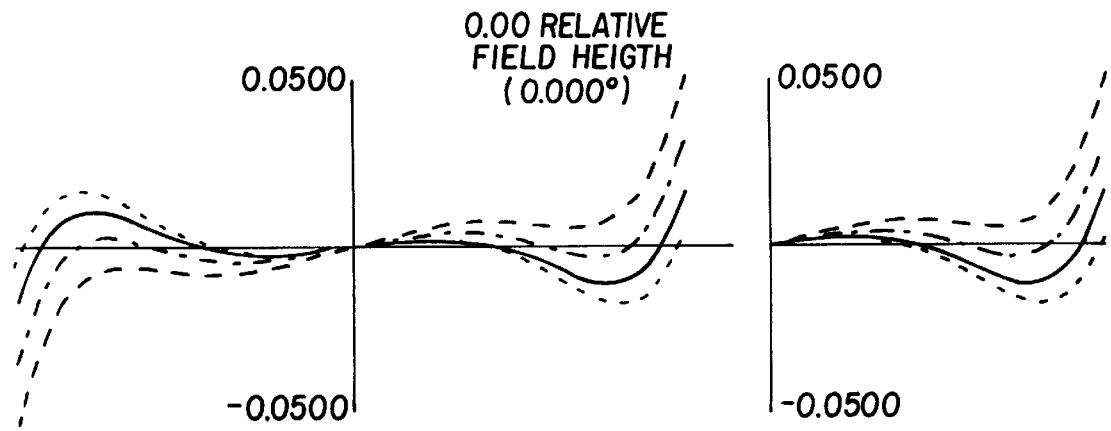
Figure 5A:
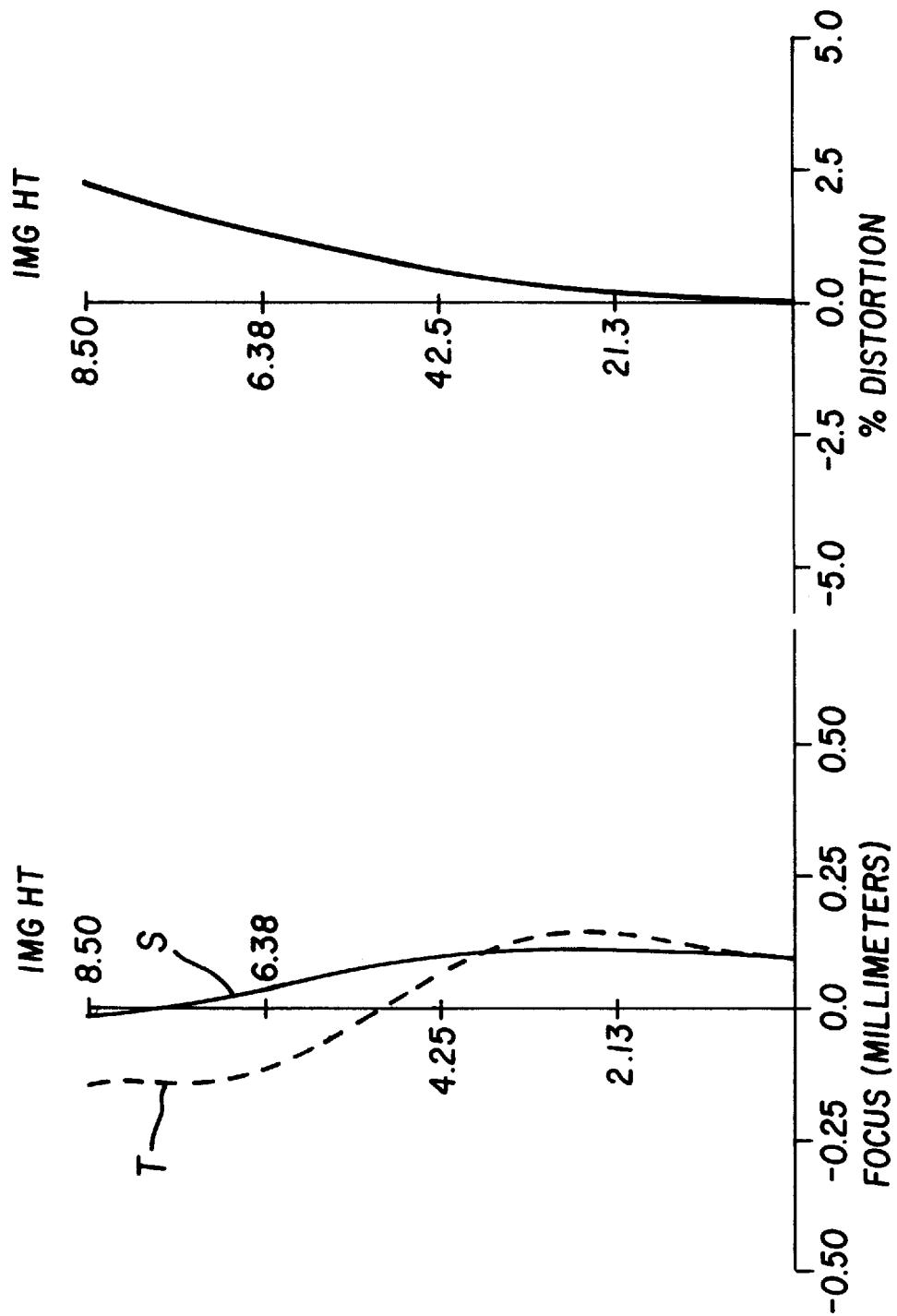
Figure 5B:
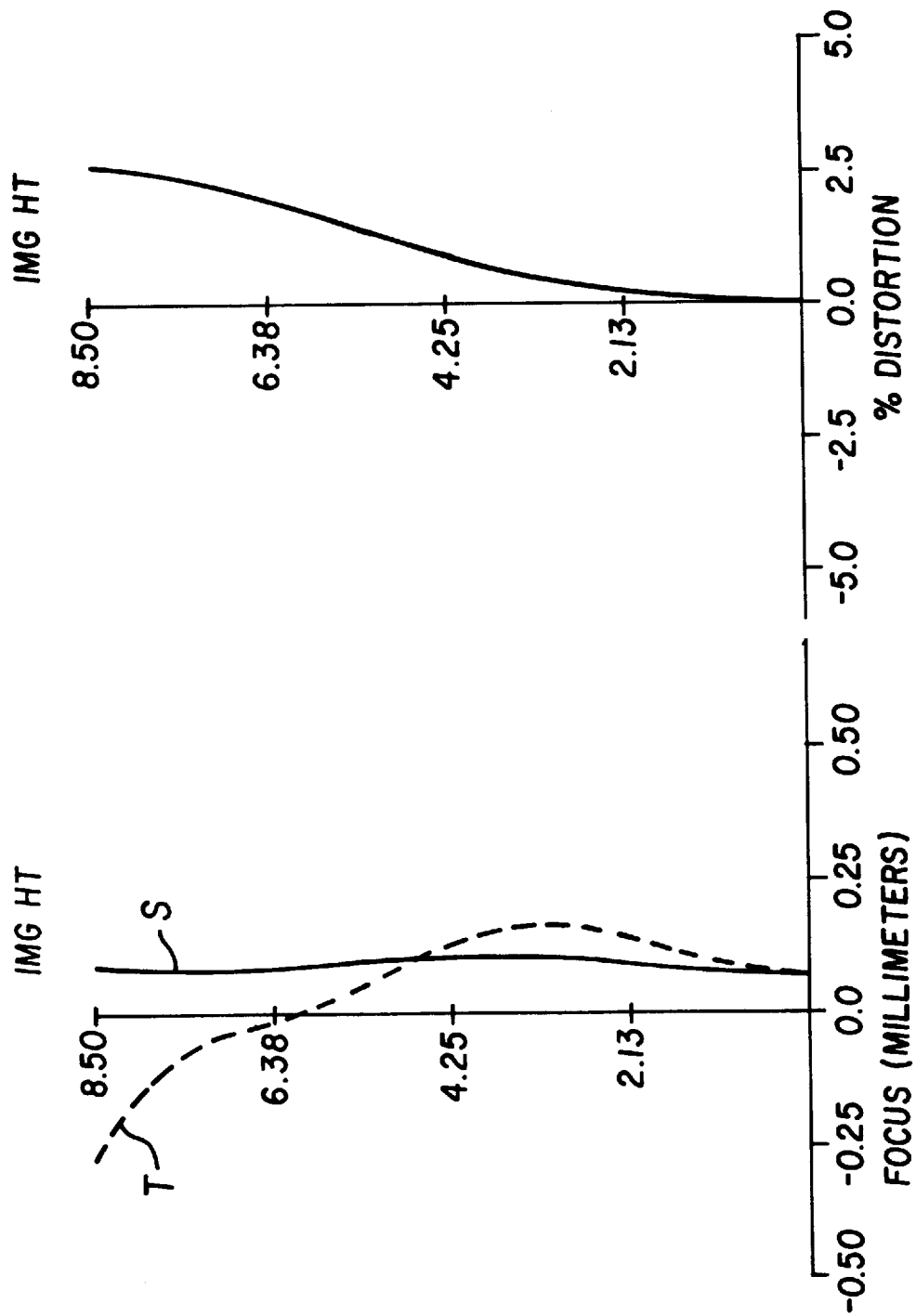
Figure 5C:
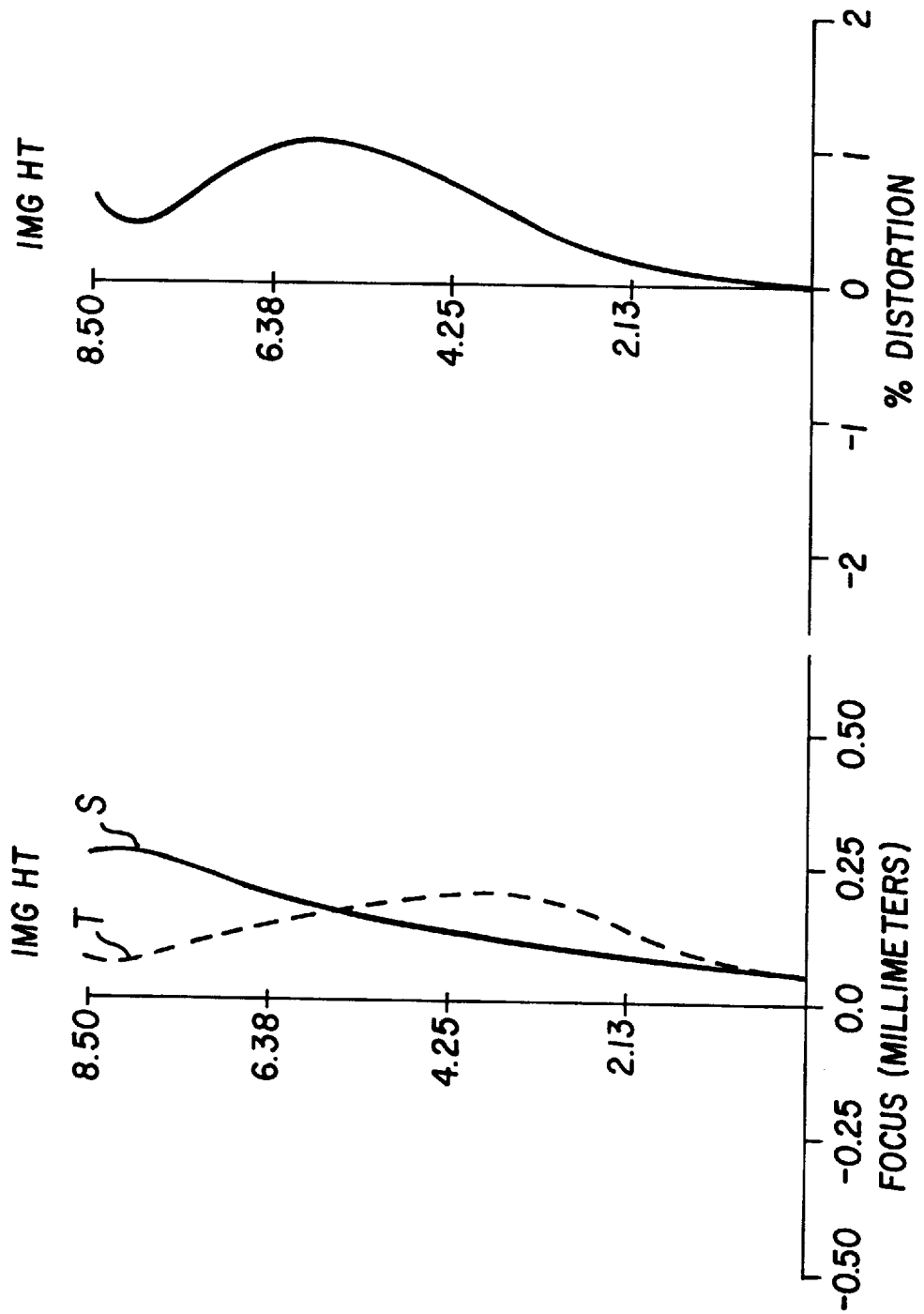

FIGS. 2A–5C detail the performance of the zoom lens 100 at wide-angle, mid-zoom and telephoto positions. Included are ray traces for the various field positions, field curvature and distortion plots for the wide-angle, mid-zoom and telephoto zoom positions. More specifically, FIGS. 2A–2C provides ray intercept plots for lens 100 when it is operating in the telephoto position at 0, 0.7, and full field of view, respectfully. FIGS. 3A–3C provide ray intercept plots for lens 100 when it is operating in the middle position on at 0, 0.7, and full field of view. FIGS. 4A–4C provide ray intercept plots for lens 100 when the zoom lens is operating at the wide-angle position. FIGS. 5A–5C represent Astigmatism and Distortion when the zoom lens is operating in the telephoto (T), middle (M) and wide-angle position (W), respectfully. These figures show that the image quality of the zoom lens 100 is very high given the relatively small number of elements, the high numerical apertures, a zoom ratio of 2, and the small number of independently moving zooming lens units. The zoom lens 100 has a compactness ratio $L_v/f_t<0.94$.

EXAMPLE 1

TABLE 1A

| Surface | Radius | Thickness ($T_i$) | Glass | $N_e$ | V |
|---|---|---|---|---|---|
| $R_1$ | 7.189 | 2.3 | SK5 | 1.587 | 61.50 |
| $R_2$ | −21.069 | 0.639 | BASF2 | 1.669 | 36.07 |
| $R_3$ | 14.636 | 1.145 | AIR | | |
| Aperture Stop | | $S_2$ = Variable | AIR | | |
| $R_4$ | −5.719 | 0.9 | Styrene | 1.595 | 31.17 |
| *$R_5$ | −6.430 | 0.2 | AIR | | |
| $R_6$ | −245.809 | 3.30 | SK5 | 1.587 | 61.50 |
| $R_7$ | −6.097 | $S_4$ = Variable | AIR | | |
| *$R_8$ | −7.098 | 0.8 | SK16 | 1.617 | 60.00 |
| *$R_9$ | 22.034 | $S_5$ = Variable | AIR | | |
| Infinity | | | AIR | | |
| Image Plane | | | | | |

*Asphere

TABLE 1B

| Aspheric Coefficients | Surface | | |
|---|---|---|---|
| | $R_5$ | $R_8$ | $R_9$ |
| AD | 1.636−03 | 0 | 2.238e−05 |
| AE | −4.395e−05 | −3.880e−05 | −1.536e−05 |
| AF | 1.531e−05 | 2.482e−06 | 2.889e−07 |
| AG | −1.187e−06 | −1.205e−07 | −9.433e−10 |
| AH | 3.344e−08 | 1.722e−09 | 0 |
| AI | 1.791e−09 | 1.377e−10 | 0 |
| AJ | −1.556e−10 | −5.562e−12 | 0 |
| AK | 3.039e−12 | 5.826e−14 | 0 |
| K | 0 | −2.770 | 0 | where K is a conic constant.

| Wavelengths (μm) | | |
|---|---|---|
| $\lambda_1$ | $\lambda_2$ | $\lambda_3$ |
| 0.5461 | 0.4861 | 0.6563 |

TABLE 1C

Zoom Spacing Data

| Zoom Position # | $S_2$ | $S_4$ | $S_5$ | *$L_v$ | BFL | EFL | f# |
|---|---|---|---|---|---|---|---|
| Wide | 2.695 | 4.155 | 3.150 | 19.284 | 3.155 | 15.0 | 2.8 |
| Mid | 4.757 | 2.092 | 7.656 | 23.790 | 7.756 | 22.5 | 3.5 |
| Telephoto | 5.950 | 0.900 | 11.925 | 28.060 | 12.147 | 30.0 | 4.0 | where BFL is the back focus distance and EFL is the focal length of the zoom lens.
*L is the distance from the front vertex of the lens to its image plane.

TABLE 1C-continued

STOP Diameter

| Zoom Position # | Diameter |
|---|---|
| Wide | 4.39 |
| Mid | 5.32 |
| Telephoto | 6.29 |

The invention has been described in detail with particular reference to a preferred embodiment thereof, but it will be understood that variations and modifications can be effected within the spirit and scope of the invention.

What is claimed is:

1. A zoom lens centered about an optical axis for imaging onto an image plane, said zoom lens comprising:
   (i) a plurality of lens elements, said lens elements arranged from an object side towards an image side into three lens units which are
   a first, positive power lens unit, said first lens unit being movable toward and away from the image plane along the optical axis;
   a second, negative power lens unit located between the first lens unit and the image plane, said second lens unit being movable toward and away from the image plane along the optical axis;
   a third, positive power lens unit, said third, positive power lens unit being located between the first and second lens units, said third lens unit being movable toward and away from the image plane along the optical axis; and
   (ii) said plurality of lens elements providing a zoom ratio greater than 1.5, an F/number in a telephoto position of less than F/5, an F/number in a wide angle position of less than F/3.6, and an overall compactness ratio $L_v/f_t<1.0$, where $L_v$ is the distance from a front vertex of the zoom lens to the image plane in the telephoto position and $f_t$ is a focal length of the zoom lens in the telephoto position.

2. A zoom lens according to claim 1, wherein said second lens unit has at least one negative lens element with an object side surface and an image side surface, said negative lens element is biconcave and biaspheric, and the object side surface of said negative lens element has more asphericity than the image side surface.

3. A zoom lens according to claim 1, wherein said F/number in the telephoto position is less than F/4.5 and said F/number in the wide angle position is less than F/3.

4. A zoom lens according to claim 3, wherein said second lens unit has at least one negative lens element with an object side surface and an image side surface, said negative lens element is biconcave and biaspheric, and the object side surface of said negative lens element has more asphericity than the image side surface.

5. A zoom lens according to claim 3, wherein said third lens unit is movable for zooming in the same direction as the first and second lens units at a slower speed than that at which the first and second lens units are moved.

6. A zoom lens according to claim 1, wherein said third lens unit is movable for zooming in the same direction as the first and second lens units at a slower speed than that at which the first and second lens units are moved.

7. A zoom lens centered about an optical axis for imaging onto an image plane, said zoom lens comprising: a plurality of lens elements arranged from an object side towards an image side into a first, positive power lens unit having a positive lens element and a negative lens element, said first lens unit being movable toward and away from the image plane along the optical axis;

a second, negative power lens unit located between the first lens unit and the image plane, said second lens unit having a biconcave negative lens element which is a biaspheric lens element with its object side surface having more asphericity than its image side surface; and a third, positive power lens unit having at least one lens element with an aspheric surface, said third, positive power lens unit being located between the first and second lens units, said third lens unit being movable in the same direction as the first and second lens units at a slower speed than that at which the first and second lens units are moved, and wherein said zoom lens has a zoom range $f_t/f_w$ which is greater than 1.5, an F/number in the wide angle position of less than F/3.6, an F/number in the telephoto position of less than F/5 and an overall compactness ratio $L_v/f_t<1.0$, where $L_v$ is the distance from the front vertex of the lens system to the film plane in the telephoto position and $f_t$ is the focal length of the zoom lens in the telephoto position.

8. A zoom lens according to claim 7, wherein said second lens unit is integral with the first lens unit so as to be movable therewith at the same rate and direction.

9. A zoom lens according to claim 7, further having an aperture stop which moves integrally with said lens elements of said first lens unit.

10. A zoom lens according to claim 8, further having an aperture stop which moves integrally with said lens elements of said first lens unit.

11. A zoom lens according to claim 8, wherein said positive lens element of said first lens unit is a frontmost lens element and is cemented to said negative lens element.

12. A zoom lens according to claim 7, wherein:
said lens elements of said first lens unit are a biconvex lens element and a biconcave lens element; and
the lens elements comprising said third lens unit are, in order from the first lens unit, a meniscus lens element having a concave object side surface and a positive power lens element.

13. A zoom lens according to claim 8, wherein:
said lens elements of said first lens unit are a first biconvex lens element and a biconcave lens element; and
the lens elements comprising said third lens unit are, in order from the first lens unit, a meniscus lens element having a concave object side surface and a positive power lens element.

14. A zoom lens comprising three lens units in order from object side:
(a) a front lens unit of positive refractive power, said front lens unit consisting of a positive lens element and a negative lens element;
(b) a middle lens unit of positive refractive power; and
(c) a rear lens unit of negative refractive power, said front lens unit and said rear lens unit are integral so as to be simultaneously movable at the same speed and direction during zooming from a wide-angle to a telephoto position while said middle lens unit is movable towards the object side at a relatively slower speed than that at which said first and third units are moved, the lens elements having sufficient optical powers, spacings and radii of curvature to provide a zoom ratio greater than 1.5, an F/number in the telephoto position of less than F/5, an F/number in the wide angle position of less than F/3.6 and an overall compactness ratio $L_v/f_t<1.0$, where $L_v$ is the distance from a front vertex of the zoom lens to the image plane in a telephoto position and $f_t$ is the focal length of the zoom lens in the telephoto position.

15. A zoom lens according to claim 14, further having an aperture stop which moves integrally with lens elements of said front lens unit.

16. A zoom lens according to claim 2 wherein V-number of the biconcave negative lens element of the second lens unit is about 60 or higher.

17. A lens centered about an optical axis for imaging onto an image plane, said zoom lens comprising: a plurality of lens elements arranged from an object side towards an image side into three lens units which are:

a first, positive power lens unit having a positive lens element and a negative lens element;

a second, negative power lens unit between the first lens unit and the image plane, said second len's unit having a biconcave negative lens element which is a biaspheric lens element with its object side surface having more asphericity than its image side; and a third, positive power lens unit having at least one lens element with an aspheric surface, said third, positive power lens unit being located between the first and second lens units.

18. A zoom lens centered about an optical axis for imaging onto an image plane, said zoom lens comprising a plurality of lens elements arranged from an object side towards an image side into:

a first, positive power lens unit having a positive lens element and a negative lens element, said first lens unit being movable toward and away from the image plane along the optical axis;

a second, negative power lens unit between the first lens unit and the image plane, said second lens unit having a negative lens element which has a V-number of at least 60, said second lens unit being movable toward and away from the image plane along the optical axis; and a third, positive power lens unit having at least one lens element with an aspheric surface, said third, positive power lens unit being located between the first and second lens units, said third lens unit being movable in the same direction as the first and second lens units at a slower speed than that at which the first and second lens units are moved.

19. A lens system according to claim 18 wherein said negative lens element of said second lens unit is biconcave.

20. A lens system according to claim 18 wherein said negative lens element of said second lens unit is biaspheric.

21. A zoom lens centered about an optical axis for imaging onto an image plane, said zoom lens comprising:
a plurality of lens elements arranged from an object side towards an image side into a first, positive power lens unit having a positive lens element and a negative lens element, said first lens unit being movable toward and away from the image plane along the optical axis;

a second, negative power lens unit between the first lens unit and the image plane, said second lens unit having a negative lens element which has, said second lens unit being movable toward and away from the image plane along the optical axis;

a third, positive power lens unit having at least one lens element with an aspheric surface, said third, positive power lens unit being located between the first and second lens units, said third lens unit being movable in the same direction as the first and second lens units at a slower speed than that at which the first and second lens units are moved, said zoom lens satisfying the following equations $F_T/\# < 5.0;$ $F_W/\# < 3.6;$ $f_t/f_w > 1.5;$ and $L_v/f_t < 1.05,$ where $L_v$ is the distance from the front vertex of the zoom lens to the image plane in the telephoto position, $f_t$ is the focal length of the zoom lens in the telephoto position, $f_w$ is the focal length of the zoom lens in the wide-angle position $F_T/\#$ is the F/number of the zoom lens in the telephoto position, and $F_W/\#$ is the F/number of the zoom lens in the wide-angle position.

* * * * *